United States Patent [19]
Potoski et al.

[11] 3,917,680
[45] Nov. 4, 1975

[54] 5,6,7,8,9,10-HEXAHYDRO-5-PHENYL-5,9-METHANOBENZOCYCLOOCTEN-11-AMINES AND RELATED COMPOUNDS

[75] Inventors: John R. Potoski, Spring City; Meier E. Freed, Paoli, both of Pa.

[73] Assignee: American Home Products Corporation, New York, N.Y.

[22] Filed: Dec. 28, 1973

[21] Appl. No.: 429,316

[52] U.S. Cl. ......... 260/571; 260/456 P; 260/471 A; 260/479 S; 260/501.18; 260/566 A; 260/590; 424/309; 424/311; 424/316; 424/330

[51] Int. Cl.² ..................................... C07C 91/02

[58] Field of Search ..................... 260/571, 501.18

[56] References Cited
UNITED STATES PATENTS
3,836,670   9/1974   Freed et al. ................. 260/571 X Primary Examiner—R. V. Hines
Attorney, Agent, or Firm—Royal E. Bright

[57] ABSTRACT

5,6,7,8,9,10-Hexahydro-5-phenyl-5,9-methanobenzocyclooctene-11-amines, intermediates therefore and processes for their preparation are disclosed. The final products have analgesic activity.

9 Claims, 1 Drawing Figure

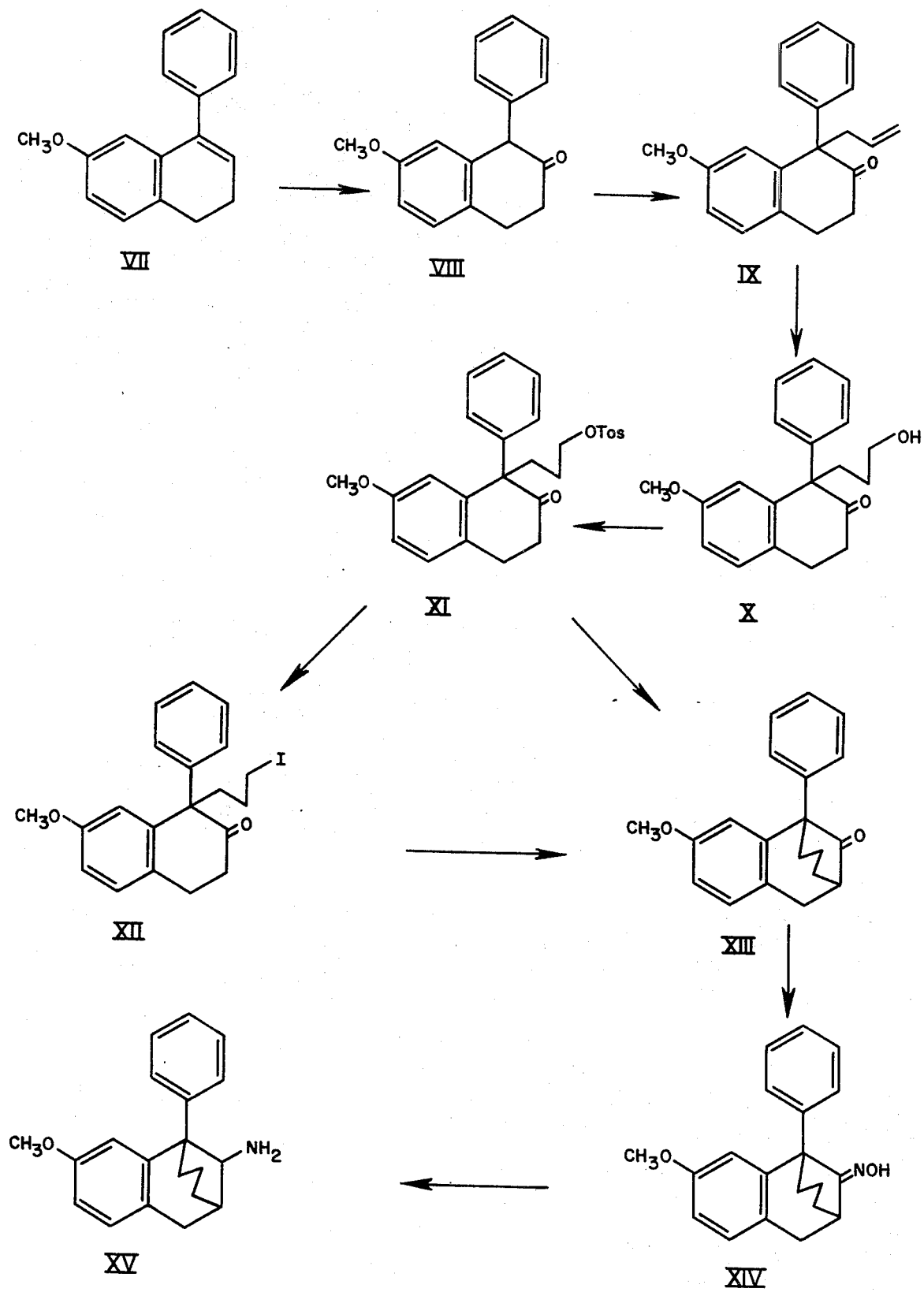

5,6,7,8,9,10-HEXAHYDRO-5-PHENYL-5,9-METHANOBENZOCYCLOOCTEN-11-AMINES AND RELATED COMPOUNDS

BACKGROUND OF THE INVENTION

This invention relates to compositions of matter classified in the art of chemistry as 5,6,7,8,9,10-hexahydro-5-phenyl-5,9-methanobenzocycloocten-11-amines.

SUMMARY OF THE INVENTION

The invention sought to be patented in its first composition aspect, is described as residing in the concept of a chemical compound of Formula I wherein R is hydrogen, lower alkyl, lower alkoxy, fluoro, or chloro; $R^1$ is hydrogen, lower alkyl or acyl; $R^2$ and $R^3$ are independently selected from the group consisting of hydrogen and lower alkyl; and the pharmaceutically acceptable acid addition salts thereof.

The tangible embodiments of the first composition aspect of the invention possess the inherent general physical properties of being, in the acid salt form, crystalline solids, are substantially insoluble in water and are generally soluble in such polar organic solvents as acetonitrile and methanol. Examination of compounds produced according to the hereinafter described process reveals, upon infrared, and nuclear magnetic resonance spectrographic analysis, spectral data supporting the molecular structures herein set forth. The aforementioned physical characteristics, taken together with the nature of the starting materials, the mode of synthesis, and the elemental analysis, confirm the structure of the compositions sought to be patented.

The tangible embodiments of the first composition aspect of the invention, wherein the amino substituent is in the α orientation and $R^2$ and $R^3$ are both either hydrogen or lower alkyl, or wherein the amino group is in the β orientation, $R^1$ is hydrogen, and $R^2$ and $R^3$ are lower alkyl, possess the inherent applied use characteristic, of exerting analgesic effects in experimental animals. The tangible embodiments of formula I which do not themselves exert these analgesic effects possess the inherent applied use characteristics of being intermediates in the synthesis of the embodiments of Formula I which do exert them.

The invention sought to be patented, in a subgeneric aspect of the first composition aspect, is described as residing in the concept of a chemical compound of Formula Ia:

wherein A is $$H \gtrless C-N(R^2)_2$$

wherein $R^2$ is hydrogen, or lower alkyl, and $R^1$ is lower alkyl; A is $$H \gtrless C-NH_2$$

and $R^1$ is hydrogen; or A is $$H-C \blacktriangleleft N(R^3)_2$$

wherein $R^3$ is lower alkyl and $R^1$ is hydrogen; and the pharmaceutically acceptable acid addition salts thereof.

The invention sought to be patented in its second composition aspect resides in the concept of a chemical compound of the Formula II:

wherein R is hydrogen, lower alkyl, lower alkoxy, fluoro, or chloro; and $R^1$ is hydrogen, or lower alkyl.

The tangible embodiments of the second composition aspect of the invention possess the inherent general physical properties of being crystalline solids, are substantially insoluble in water, and are generally soluble in such solvents as warm methanol and acetonitrile.

Examination of compounds produced according to the hereinafter described process reveals, upon ultraviolet, infrared, and nuclear magnetic resonance spectrographic analysis, spectral data supporting the molecular structures herein set forth. The aforementioned physical characteristics, taken together with the nature of the starting materials, the mode of synthesis, and the elemental analysis, confirm the structure sought to be patented.

The tangible embodiments of the second composition of matter possess the inherent applied use characteristic of being intermediates in the preparation of the amines of Formula I.

The invention sought to be patented, in a subgeneric aspect of the second composition aspect, is described as residing in the concept of a chemical compound of Formula IIa:

wherein R¹ is hydrogen or lower alkyl.

The invention sought to be patented in its third composition aspect is described as residing in the concept of a chemical compound of Formula III:

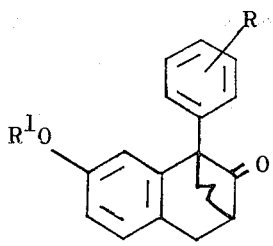

III wherein R is hydrogen, lower alkyl, lower alkoxy, fluoro, or chloro; and R¹ is hydrogen or lower alkyl.

The tangible embodiments of the third composition aspect of the invention possess the inherent general physical characteristics of being crystalline solids, are substantially insoluble in water, and are generally soluble in such organic solvents as acetone and methanol. Examination of compounds produced according to the hereinafter described process reveals, upon ultraviolet, infrared and nuclear magnetic resonance spectrographic analysis, spectral data supporting the molecular structures herein set forth. The aforementioned physical characteristics, taken together with the nature of the starting materials, the mode of synthesis, and the elemental analysis, confirm the structures of the compositions sought to be patented.

The tangible embodiments of the third composition aspect of the invention possess the inherent applied use characteristic of being intermediates in the production of the amines of Formula I.

The invention sought to be patented, in a subgeneric aspect of the third composition aspect, is described as residing in the concept of a chemical compound of Formula IIIa:

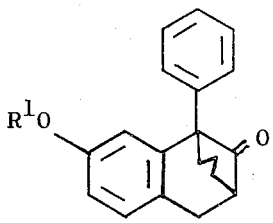

IIIa wherein R¹ is hydrogen or lower alkyl.

The invention sought to be patented, in its fourth composition aspect, is described as residing in the concept of a chemical compound of Formula IV:

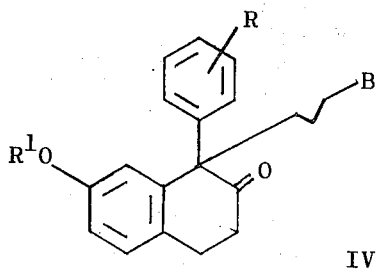

IV wherein R is hydrogen, lower alkyl, lower alkoxy, fluoro, or chloro; R¹ is lower alkyl; and B is iodo, hydroxy, lower alkyl sulfonyl, or carbocyclic aryl sulfonyl.

The tangible embodiments of the fourth composition aspect of the invention possess the inherent general physical properties of being amorphous oils or crystalline solids at room temperature, are substantially insoluble in water, and are generally soluble in such organic solvents as warm ethanol, and acetonitrile. Examination of compounds produced according to the hereinafter described process reveals, upon infrared and nuclear magnetic resonance spectrographic analysis, spectral data supporting the molecular structures herein set forth. The aforementioned physical characteristics, taken together with the nature of the starting materials, the mode of synthesis, and the elemental analysis, confirm the structure of the compositions sought to be patented.

The tangible embodiments of the fourth composition aspect of the invention possess the inherent applied use characteristics of being intermediates in the production of the amines of Formula I.

The invention sought to be patented, in a subgeneric aspect of the fourth principal composition aspect of the invention, is described as residing in the concept of a chemical compound of Formula IVa:

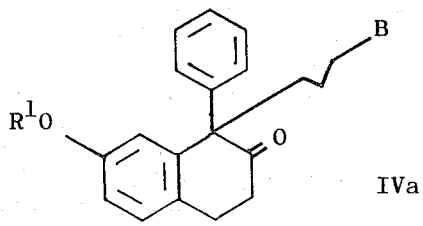

IVa wherein R¹ is lower alkyl and B is iodo, hydroxy, lower alkylsulfonyl, or carbocyclic aryl sulfonyl.

The invention sought to be patented, in its fifth composition of matter aspect resides in the concept of a chemical compound of Formula V:

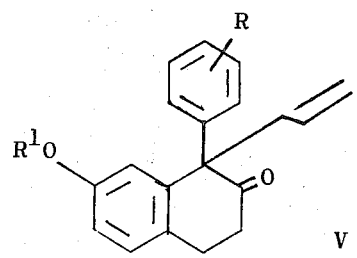

V wherein R is hydrogen, lower alkyl, lower alkoxy, fluoro, or chloro; and R¹ is lower alkyl.

The tangible embodiments of the fifth composition aspect of the invention possess the inherent general physical properties of being crystalline solids, are substantially insoluble in water, and are generally soluble in such organic solvents as acetone and ethanol. Examination of compounds produced according to the hereinafter described process reveals, upon ultraviolet, infrared and nuclear magnetic resonance spectrographic analysis, spectral data supporting the molecular structures hereinbefore set forth. The aforementioned physical characteristics, taken together with the nature of the starting materials, the mode of synthesis, and the elemental analysis, confirm the structure of the composition sought to be patented.

The tangible embodiments of the fifth composition aspect of the invention possess the inherent applied use characteristic of being intermediates in the synthesis of the amines of Formula I.

The invention sought to be patented, in a subgeneric aspect of the fifth composition aspect, resides in the concept of a chemical compound of Formula Va:

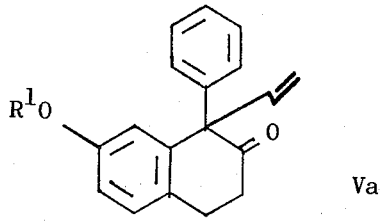

Va wherein $R^1$ is lower alkyl.

The invention sought to be patented, in its sixth composition aspect, resides in the concept of a chemical compound of Formula VI:

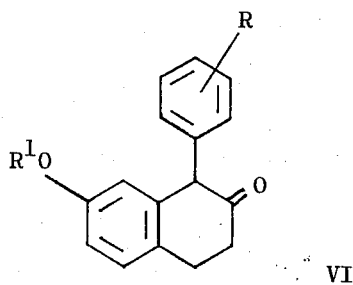

VI wherein R is hydrogen, lower alkyl, lower alkoxy, fluoro, or chloro; and $R^1$ is lower alkyl.

The tangible embodiments of the sixth composition aspect of the invention possess the inherent general physical properties of being high boiling liquids, are substantially insoluble in water but are miscible with such organic solvents as ether, and acetone. Examination of compounds produced by the hereinafter described process reveals upon infrared, and nuclear magnetic resonance spectrographic analysis, spectral data supporting the molecular structure hereinbefore set forth. The aforementioned physical characteristics, taken together with the nature of the starting materials, the mode of synthesis, and the elemental analysis, confirm the structure of the compositions sought to be patented.

The tangible embodiments of the sixth composition aspect of the inherent applied use characteristic of being intermediates in the production of amines of Formula I.

The invention sought to be patented in a subgeneric aspect of the sixth composition aspect of the invention, resides in the concept of a chemical compound of Formula VIa:

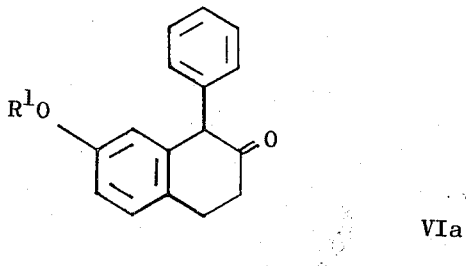

VIa wherein $R^1$ is lower alkyl.

DESCRIPTION OF THE PREFERRED EMBODIMENTS

In describing the synthesis of the compositions of the invention reference will be made to the figure wherein the formulae representing the various embodiments of the invention have been assigned Roman numerals for purposes of identification, and wherein is illustrated the synthesis of a specific embodiment of Formula I, namely 5,6,7,8,9,10-hexahydro-3-methoxy-5-phenyl-5,9-methanobenzocycloocten-11-amine (XV); a specific embodiment of Formula II, namely 5,6,7,8,9,10-hexahydro-3-methoxy-5-phenyl-5,9-methanobenzocycloocten-11-one, oxime (XIV); a specific embodiment of Formula III, namely 5,6,7,8,9,10-hexahydro-3-methoxy-5-phenyl-5,9-methanobenzocycloocten-11-one (XIII); specific embodiments of Formula IV namely 1-(3-iodopropyl)-7-methoxy-1-phenyl-2-tetralone (XII), 7-methoxy-1-phenyl-1(3-p-toluenesulfonylpropyl)-2-tetralone (XI), and 1-(3-hydroxypropyl)-7-methoxy-1-phenyl-2-tetralone (X); a specific embodiment of Formula V, namely 7-methoxy-1-phenyl-1-(2-propenyl)-2-tetralone (IX); and a specific embodiment of Formula VI, namely 1-phenyl-7-methoxy-2-tetralone (VIII).

Treatment of 1,2-dihydro-4-phenyl-6-methoxy-naphthalene (VII) with peracid in a procedure analogous to that described in the "Journal of the Chemical Society," 1958, page 1249 for the preparation of 1-methyl-7-methoxy-2-tetralone gives VIII.

Condensation of VIII with an allyl halide, conveniently allyl bromide, in the presence of a strong base, conveniently potassium t-butoxide, gives IX. Conversion of IX to X is conveniently accomplished by treating IX with diborane in the usual fashion followed in the usual way be treatment with base and hydrogen peroxide. Treatment of X with p-toluene sulfonyl chloride in the presence of a hydrogen chloride scavenger, conveniently pyridine gives XI. XI treated in the usual fashion with sodium iodide gives XII. XIII may be prepared from either XI or XII by treatment with strong base, conveniently potassium t-butoxide. Treatment of XIII with hydroxylamine under basic conditions gives XIV. Reduction of XIV, conveniently hydrogenation using a Raney nickel catalyst in the presence of ammonia, gives XV.

While the process of the invention has been described with reference to the drawing, which illustrates its application to 1,2-dihydro-6-methoxy-4-phenyl-naphthalene, it will be readily apparent that the process will equally be applicable to 4-aryl-1,2-dihydro-naphthalenes bearing in the 6 position, and on the aryl moiety, the various substituents contemplated within the scope of the invention.

The substitution of other sulfonyl chlorides for the p-toluene sulfonyl chloride illustrated is similarly obvious to one skilled in the art.

If desired, the introduction of one or two lower alkyl substituents into primary amines such as XV may, of course, be accomplished by standard methods. Reaction with a haloformic ester followed by hydride reduction is a particularly convenient method for the introduction of methyl groups, and formation of an amide, for example, by reaction with an acyl halide, followed by reduction, conveniently with a bimetallic hydride reducing agent, is a convenient method for the introduction of polycarbon alkyl groups.

The cleavage of alkyl aromatic ethers may, if desired, also be accomplished by standard methods. Acid cleavage using, for example hydrogen bromide or boron tribromide is particularly convenient. Cleavage may, of course, be performed at any stage once the tricyclic ketone such as XIII has been formed except for, of course, the tricyclic oxime stage.

The starting materials for the practice of the invention, namely the aforementioned variously substituted 4-aryl-6-alkoxy-1,2-dihydronaphthalenes may be prepared from the corresponding aryl grignard reagent and the corresponding 1-tetralone by a synthesis analogous to that described by Snickers and Zollinger in the Helvetica Chimica Acta, 53, 1294, (1970) for the preparation of 1,2-dihydro-6-methoxy-4-phenyl-naphthalene.

Synthesis of those tetralones which may not be commercially available are readily available in the literature, for example, the synthesis of α-tetralone described in Organic Synthesis, Collective Volume IV page 898 may be readily adapted for the purpose.

It will be obvious to one skilled in the art of chemistry that the compounds of III will be produced as racemic mixtures, and that reduction of the oximes of Formula II will yield the amines of Formula I as diastereomers. The separation of diastereomeric pairs and their resolution into enantiomers, if desired, may be accomplished by well-known procedures. The diastereomers, enantiomers, and mixtures thereof are all included within the scope of this invention.

The analgesic activity of the tangible embodiments of the invention can be elicited by following a modification of the test procedure described by D'Amour and Smith in *Journal of Pharmacology*, 72, 74 (1941), an accepted test for analgesic agents. In this test, rats are administered the compound orally, intraperitoneally, or intramuscularly, and time required for response to a pain stimulus caused by a high intensity beam of light shining on the tail measured. The compounds of the invention exhibit analgesic activity, in rats, at a dose of from 25 to 50 mg. per kg. of body weight when administered intraperitoneally.

When the tangible embodiments of Formula I are employed as analgesic agents they may be administered to warm-blooded animals, e.g. mice, rats, rabbits, monkeys, and so forth, alone or in combination with pharmacologically acceptable carriers.

The dosage employed upon administration of the tangible embodiments of the invention will vary with the form of administration and the compound chosen. Furthermore, it will vary with the particular subject under treatment. Generally, treatment is initiated with small dosages substantially less than the optimum dose of the compound. Thereafter the dosage is increased by small increments until the optimum effect under the circumstances is reached. In general, the tangible embodiments of the invention are most desirably administered at concentration level that will generally afford effective results without causing any harmful or deleterious side effects.

As used herein, the term "lower alkyl" means a saturated hydrocarbon radical, including straight and branched radicals, having from 1 to 6 carbon atoms, among which are, for the purposes of illustration, but without limiting the generality of the foregoing, methyl, ethyl, propyl, i-propyl and i-butyl. The term acyl means either an aliphatic or aromatic carbonyl radical; if aliphatic, it may contain from 2 to 7 carbon atoms either straight chain, branched, or concatenated to form a carbocyclic ring, among which are for the purposes of illustration without limiting the generality of the foregoing acetyl, propionyl, butyryl, i-butyryl, cyclopropane carboxyl and cyclohexane carboxyl; if aromatic, it may contain an unsubstituted carbocyclic aromatic nucleus, or a carbocyclic aromatic nucleus ring substituted by lower alkyl, among which are for the purposes of illustration, but without limiting the generality of the foregoing, benzoyl, o-, m-, or p-toluyl, p-, or m-ethylbenzoyl.

The following examples further illustrate the best mode contemplated by the inventors for the practice of their invention:

EXAMPLE I

7-Methoxy-1-Phenyl-2-Tetralone

To a stirred solution of 1,2-dihydro-6-methoxy-4-phenylnaphthalene (86 g.) in 200 ml. of chloroform is added a solution of m-chloroperbenzoic acid (82 g. of 85% assayed material) in 1 liter of chloroform. The temperature is maintained at 0° to 10° during the addition. The resultant mixture is allowed to stand overnight, and then filtered. The filtrate is concentrated and the residue dissolved in ether and washed with dilute carbonate solution. The ether solution is then concentrated and the residue refluxed for 2½ hours with 200 ml. of water, 200 ml. of ethanol and 80 ml. of concentrated sulfuric acid. This mixture is concentrated to about 250 ml. diluted with water (300 ml.) and extracted with ether. The ether portion is washed with dilute sodium hydroxide, saturated sodium chloride, dried, concentrated and distilled to give the title product, 61 g., B.P. 155°–165° (0.25 mm.).

IR Analysis: $\lambda_{max}^{film}$ 5.80μ.

EXAMPLE II

7-Methoxy-1-Phenyl-1-(2-Propenyl)-2-Tetralone

To a stirred solution of potassium metal (16 g.) dissolved in 1 liter t-butyl alcohol is added 90 g. of 7-methoxy-1-phenyl-2-tetralone. To the resulting solution is added 110 g. of allyl bromide. The mixture is stirred overnight and concentrated. The residue is dissolved in ether, filtered, concentrated and distilled to give 87 g. of crude product b.p. 170° to 175° at 0.4 mm. Crystallization from hexane gives 70 g. of white solid suitable for further work. The analytical sample has m.p. 73°–76°.

Analysis for: $C_{20}H_{20}O$ Calculated: C, 82.15; H, 6.89. Found: C, 81.71; H, 6.87.

EXAMPLE III

1-(3-Hydroxypropyl)-7-Methoxy-1-Phenyl-2-tetralone

To a stirred solution of diborane in tetrahydrofuran (100 ml. of ~ 1 molar solution in $BH_3$) at 0° under nitrogen is added 20 ml. of 2-methyl-2-butene. This solution is stirred for 1½ hours then is added to a stirred solution of 7-methoxy-1-phenyl-1-(2-propenyl)-2-tetralone (29 g., 0.1 m.) in 200 ml. of tetrahydrofuran at 0° to −10°. The mixture is stirred overnight at room temperature. The mixture is treated with 4.2 g. of sodium hydroxide in 45 ml. of water, then with the temperature kept below 25°, 30 ml. of 30° hydrogen peroxide is added. The mixture is then extracted repeatedly with ether. The ether extracts are washed with dilute sodium hydroxide, saturated sodium chloride, dried and concentrated. The residue is then placed on a dry column of 3 kg. alumina. Elution with chloroform gives a compact product band which is cut out and washed several times with ethyl acetate. Concentration of the ethyl acetate washes yields the title product, 20 g.

I.R. Analysis: $\lambda_{max}^{film}$ 3.0, 5.8$\mu$.

EXAMPLE IV

7-Methoxy-1-Phenyl-1-(3-p-Toluensulfonyl-Propyl)-2-Tetralone

A solution of 1-(3-hydroxypropyl)-7-methoxy-1-phenyl-2-tetralone (20 g.) and p-toluenesulfonyl chloride (30 g.) in 300 ml. of dry pyridine is allowed to stand overnight at −10°, the mixture is poured into a mixture of ice and excess hydrochloric acid. The mixture is extracted with ethyl acetate, dried and concentrated to give 25.5 g. of the title product as white crystalline solid, which after recrystallization from hexane-ethyl acetate has m.p. 102°–104°.

I.R. Analysis: $\lambda_{max}^{KBr}$ 5.8, 7.4, 8.5$\mu$.

EXAMPLE V 1-(3-Iodopropyl)-7-Methoxy-1-Phenyl-2-Tetralone

A solution of 7-methoxy-1-phenyl-1-(3-p-toluenesulfonylpropyl)-2-tetralone (25.5 g.) and sodium iodide (100 g.) in 500 ml. of acetone is refluxed for 1 hour. The mixture is concentrated and the residue partitioned between ethyl acetate and water. The organic layer is dried and concentrated to give 22 g. of yellowish, solid product suitable for further work. Recrystallization from ethanol gives the title product as a white solid with m.p. 101°–103°.

Analysis for: $C_{20}H_{21}O_2I$ Calculated: C, 57.15; H, 5.04. Found: C, 57.87; H, 5.31.

EXAMPLE VI 5,6,7,8,9,10-Hexahydro-3-Methoxy-5-Phenyl-5,9-Methanobenzocycloocten-11-One To a stirred solution of potassium metal (5.5 g.) dissolved in 400 ml. of t-butylalcohol under nitrogen is added a solution of 1-(3-iodopropyl)-7-methoxy-1-phenyl-2-tetralone (44 g.) in 400 ml. of t-butylalcohol (warming is needed to effect solution). The reaction mixture is stirred at room temperature for 1½ hours and is refluxed for ½ hour. The reaction mixture is concentrated and the residue is partitioned between water and ethyl acetate. The organic portion is dried and concentrated to give 33 g. of yellow solid with m.p. 95°–107°. Recrystallization from hexane-benzene, then ethanol-water gives the title produce with m.p. 115°–117°.

Analysis for: $C_{20}H_{20}O_2$ Calculated: C, 82.15; H, 6.89. Found: C, 82.27; H, 7.14.

EXAMPLE VII 5,6,7,8,9,10-Hexahydro-3-Methoxy-5-Phenyl-5,9-Methanobenzocycloocten-11-One, Oxime A solution of 5,6,7,8,9,10-hexahydro-3-methoxy-5-phenyl-5,9-methanobenzocycloocten-11-one (32.5 g.) and hydroxyl amine hydrochloride (50 g.) in 500 ml. of pyridine is refluxed for 2 hours. Most of the pyridine is removed under vacuum and the residue is treated with water and allowed to stand for 4 hours. Filtration gives 29.5 g. of yellowish solid, m.p. 190°–215°. Recrystallization from ethanol gives title product with m.p. 222°–224°.

Analysis for: $C_{20}H_{21}NO$ calculated: C, 78.14; H, 6.89; N, 4.56. Found: C, 77.99; H, 7.08; N, 4.53.

EXAMPLE VIII 5,6,7,8,9,10-Hexahydro-3-Methoxy-5$\alpha$-Phenyl-5,9-Methanobenzocycloocten-11-Amine A. A mixture of 5,6,7,8,9,10-hexahydro-3-methoxy-5-phenyl-5,9-methanobenzocycloocten-11-one, oxime (22 g.), ethanol (400 ml.), ammonium hydroxide (50 ml.) and Raney nickel (7 teaspoons) is hydrogenated at 47 psi pressure in a Parr shaker. The catalyst is then separated by filtration and the filtrate concentrated to give a viscous oil (21.5 g.). Examination of this oil by gas liquid chromatography indicates that it consists of 82% $\alpha$-amine epimer and 18% $\beta$-amine epimer. Repeated recrystallizations from hexane give the $\alpha$-epimer of the title product 12.9 g., m.p. 106°–108°.

Analysis for: $C_{20}H_{23}NO$ Calculated: C, 81.87; H, 7.90; N, 4.77. Found: C, 81.52; H, 8.32; N, 4.77.

Treatment with hydrogen chloride gives the hydrochloride salt m.p. approximately 160°.

Analysis for: $C_{20}H_{23}NO \cdot NCl \cdot \frac{1}{2} H_2O$ Calculated: C, 67.30; H, 7.62; N, 3.93. Found: C, 67.73; H, 7.75; N, 3.86.

B. Fractional crystallization of the mother liquors of part A from hexane gives a residue containing 80% $\beta$-epimer and 20% $\alpha$. This is taken up in acetone and converted to the fumaric acid salt. Fractional crystallization of this salt gives the fumarate salt of the $\alpha$-epimer m.p. 228° and the fumarate salt of the $\beta$-epimer, 2.6 g., m.p. 116°–125° dec.

Analysis for: $C_{24}H_{27}NO_5$ Calculated: C, 70.4; H, 6.7; N, 3.4. Found: C, 71.5; H, 7.4; N, 3.6.

Conversion of the fumarate salt to the free base gives the $\beta$-epimer of the title product as a viscous, colorless oil.

EXAMPLE IX 5,6,7,8,9,10-Hexahydro-3-Methoxy-N-Methyl-5$\alpha$-Phenyl-5,9-Methanobenzocycloocten-11$\alpha$-Amine A mixture of 5,6,7,8,9,10-hexahydro-3-methoxy-5$\alpha$-phenyl-5,9-methanobenzocycloocten-11$\alpha$-amine (8.0 g.) 13 ml. of ethylchloroformate, 150 ml. of methylene chloride and 100 ml. of saturated aqueous sodium bicarbonate is stirred at room temperature for 3 hours. The organic layer is separated, washed with dilute acid, dried and concentrated to give 10 g. of viscous oil. This oil in a little tetrahydrofuran is added to a stirred mixture of 5 g. of lithium aluminum hydride in 250 ml. of tetrahydrofuran. The mixture is refluxed overnight then treated with ammonium hydroxide and filtered. The filtrate is concentrated to give crude product, 7 g. Conversion to the hydrochloride salt in tetrahydrofuran gives the title product as its hydrogen chloride addition salt, 5.5 g., m.p. 283°–284°.

Analysis for: $C_{21}H_{26}NOCl$ Calculated: C, 73.34; H, 7.62; N, 4.07. Found: C, 73.20; H, 8.01; N, 3.88.

EXAMPLE X 5,6,7,8,9,10-Hexahydro-3-Methoxy-N-Methyl-5$\alpha$-Phenyl-5,9-Methanobenzocycloocten-11$\beta$-Amine Following a procedure analogous to that described in Example IX for the preparation of 5,6,7,8,9,10-hexahydro-3-methoxy-N-methyl-5α-phenyl-5,9-methanobenzocycloocten-11α-amine there is obtained from 5,6,7,8,9,10-hexahydro-3-methoxy-5α-phenyl-5,9-methanobenzocycloocten-11β-amine (1.0 g.), 0.4 g. of the title product as its hydrogen chloride addition salt.

NMR Analysis: Signals at δ = 2.17 (N-methyl) ppm.

EXAMPLE XI 5,6,7,8,9,10-Hexahydro-3-Methoxy-N,N-Dimethyl-5α-Phenyl-5,9-Methanobenzocycloocten-11α-Amine Following a procedure analogous to that described in Example IX for the preparation of 5,6,7,8,9,10-hexahydro-3-methoxy-N-methyl-5α-phenyl-5,9-methanobenzocycloocten-11α-amine there is obtained from 5,6,7,8,9,10-hexahydro-3-methoxy-N-methyl-5α-phenyl-5,9-methanobenzocycloocten-11α-amine (4.0 g.), 4.5 g. of the title product as the hydrochloride addition salt which is recrystallized from ethanol ether, m.p. 234°–236°.

Analysis for: $C_{22}H_{27}NO.NCl.½ H_2O$ Calculated: C, 72.91; H, 7.92; N, 3.87. Found: C, 72.97; H, 8.01; N, 3.74.

EXAMPLE XII 5,6,7,8,9,10-Hexahydro-3-Methoxy-N,N-Dimethyl-5α-Phenyl-5,9-Methanobenzocycloocten-11β-Amine Following a procedure analogous to that described in Example IX for the preparation of 5,6,7,8,9,10-hexahydro-3-methoxy-N-methyl-5α-phenyl-5,9-methanobenzocycloocten-11α-amine there is obtained from 5,6,7,8,9,10-hexahydro-3-methoxy-N-methyl-5α-phenyl-5,9-methanobenzocycloocten-11β-amine, the title product.

NMR Analysis: Signals at δ = 2.15 (N-methyl) ppm.

EXAMPLE XIII 5,6,7,8,9,10-Hexahydro-11α-Dimethylamino-5α-Phenyl-5,9-Methanobenzocycloocten-3Ol 5,6,7,8,9,10-hexahydro-3-methoxy-N,N-dimethyl-5α-phenyl-5,9-methanobenzocycloocten-11β-amine (2.5 g.) in 48% hydrobromic acid (50 ml.) is refluxed under $N_2$ for ½ hour. Concentration of the solution and crystallization of the resulting residue from ethanol ether gives the title product as its hydrogen bromide addition salt, 2.2 g., m.p. 185°–189°.

Analysis for: $C_{21}H_{25}NO.HBr.½ H_2O$ Calculated: C, 63.47; H, 6.85; N, 3.53. Found: C, 62.97; H, 7.04; N, 3.73.

EXAMPLE XIV 5,6,7,8,9,10-Hexahydro-11β-Dimethylamino-5α-Phenyl-5,9-Methanobenzocycloocten-3-Ol Following a procedure analogous to that described in Example XIII for the preparation of 5,6,7,8,9,10-hexahydro-11α-dimethylamino-5α-phenyl-5,9-methanobenzocycloocten-3-ol, there is obtained from 5,6,7,8,9,10-hexahydro-3-methoxy-N,N-dimethyl-5α-phenyl-5,9-methanobenzocycloocten-11β-amine (300 mg.), the title product (165 mg.) as its hydrogen bromide addition salt, m.p. 249°–251°.

Analysis for: $C_{21}H_{25}NO.NBr.¼ H_2O$ Calculated: C, 64.20; H, 6.80; N, 3.57. Found: C, 64.11; H, 7.07; N, 3.95.

EXAMPLE XV

11α-Amino-5,6,7,8,9,10-Hexahydro-5α-Phenyl-5,9-Methanobenzocycloocten-3-Ol

Following a procedure analogous to that described in Example XIII for the preparation of 5,6,7,8,9,10-hexahydro-11α-dimethylamino-5α-phenyl-5,9-methanobenzocycloocten-3-ol there is obtained from 5,6,7,8,9,10-hexahydro-3-methoxy-5α-phenyl-5,9-methanobenzocycloocten-11α-amine (2.0 g.), 1.85 g. of the title product as its hydrogen bromide addition salt, m.p. >325°.

Analysis for: $C_{19}H_{21}NO.HBr$ Calculated: C, 63.33; H, 6.16; N, 3.89. Found: C, 62.78; H, 6.20; N, 3.89.

EXAMPLE XVI

11β-Amino-5,6,7,8,9,10-Hexahydro-5α-Phenyl-5,9-Methanobenzocycloocten-3-Ol

Following a procedure analogous to that described in Example XIII for the preparation of 5,6,7,8,9,10-hexahydro-11α-dimethylamino-5α-phenyl-5,9-methanobenzocycloocten-3-ol there is obtained from 5,6,7,8,9,10-hexahydro-3-methoxy-5α-phenyl-5,9-methanobenzocycloocten-11β-amine (1.0 g.), 0.75 g. of the title product as its hydrogen bromide addition salt, m.p. 305°–307°.

Analysis for: $C_{19}H_{21}NO.NBr$ Calculated: C, 63.33; H, 6.16; N, 3.89. Found: C, 63.06; H, 5.96; N, 3.90.

The subject matter which applicants regard as their invention is particularly pointed and claimed as follows:

1. A compound of the formula:

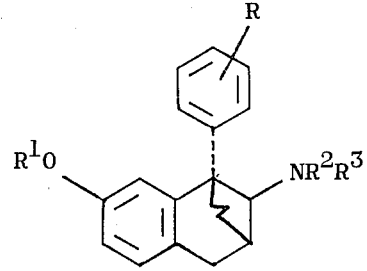

wherein R is hydrogen, lower alkyl, lower alkoxy, fluoro, or chloro; $R^1$ is hydrogen, or lower alkyl, $R^2$, and $R^3$ are independently selected from the group consisting of hydrogen and lower alkyl; and the pharmaceutically acceptable acid addition salts thereof.

2. A chemical compound as described in claim 1 of the formula:

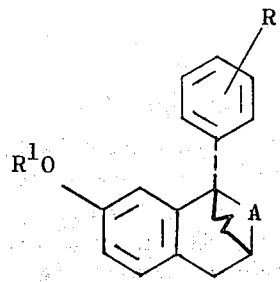

wherein R is hydrogen, lower alkyl, lower alkoxy, fluoro, or chloro; A is

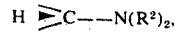

wherein $R^2$ is hydrogen or lower alkyl and $R^1$ is hydrogen or lower alkyl; or A is

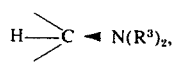

wherein $R^3$ is lower alkyl and $R^1$ is hydrogen.

3. A compound as defined in claim 2 wherein R is hydrogen.

4. A compound as defined in claim 3 wherein $R^1$ is lower alkyl.

5. A compound as defined in claim 3 wherein $R^1$ and $R^2$ are methyl.

6. A compound as defined in claim 3 wherein $R^1$ and $R^2$ are hydrogen.

7. A compound as defined in claim 3 wherein $R^1$ is lower alkyl and $R^2$ is hydrogen.

8. A compound as defined in claim 3 wherein $R^1$ is hydrogen and $R^3$ is methyl.

9. A compound as defined in claim 3 wherein $R^1$ is hydrogen.

* * * * *